(12) United States Patent
Foes

(10) Patent No.: US 12,377,915 B1
(45) Date of Patent: Aug. 5, 2025

(54) CAMBER ADJUSTMENT SYSTEM

(71) Applicant: Brent Henry Foes, Pasadena, CA (US)

(72) Inventor: Brent Henry Foes, Pasadena, CA (US)

(73) Assignee: Brent Henry Foes, Pasadena, CA (US)

( * ) Notice: Subject to any disclaimer, the term of this patent is extended or adjusted under 35 U.S.C. 154(b) by 0 days.

(21) Appl. No.: 18/751,611

(22) Filed: Jun. 24, 2024

Related U.S. Application Data

(60) Provisional application No. 63/522,868, filed on Jun. 23, 2023.

(51) Int. Cl.
*B62D 17/00* (2006.01)

(52) U.S. Cl.
CPC .................................. *B62D 17/00* (2013.01)

(58) Field of Classification Search
None
See application file for complete search history.

(56) References Cited

U.S. PATENT DOCUMENTS

| | | | | |
|---|---|---|---|---|
| 6,224,075 B1 * | 5/2001 | McIntyre | ............... | B62D 17/00 280/86.756 |
| 6,478,318 B1 * | 11/2002 | Allman | ................... | B60G 7/008 280/86.754 |
| 6,485,038 B1 * | 11/2002 | Garrard | .................. | B62D 17/00 280/86.754 |
| 6,851,687 B2 * | 2/2005 | Klais | ..................... | B62D 17/00 280/86.754 |
| 7,168,717 B2 * | 1/2007 | Wubben | ............... | B60B 35/1054 280/124.157 |
| 7,513,514 B1 * | 4/2009 | Schlosser | ............... | B62D 17/00 280/86.756 |
| 7,857,332 B2 * | 12/2010 | Hsu | ........................ | B60G 7/005 280/86.757 |
| 10,994,580 B1 * | 5/2021 | Ryshavy | ................ | B62D 17/00 |
| 11,130,378 B1 * | 9/2021 | Lambert | ............... | B60G 7/008 |
| 11,254,176 B1 * | 2/2022 | Ryshavy | ............... | B60G 7/005 |
| 12,122,211 B1 * | 10/2024 | Petrina | ................... | B60G 7/001 |
| 2002/0063408 A1 * | 5/2002 | Klais | ....................... | B60G 7/02 280/124.134 |
| 2005/0212244 A1 * | 9/2005 | Bobbitt, III | ............ | B60G 7/008 280/86.751 |
| 2022/0048568 A1 * | 2/2022 | Fischer | ................... | B60G 7/008 |
| 2024/0399806 A1 * | 12/2024 | Petrina | ................... | B60G 7/005 |

FOREIGN PATENT DOCUMENTS

| | | | | | |
|---|---|---|---|---|---|
| CA | 3114342 A1 | * | 4/2020 | ............ | B60G 11/36 |
| CN | 106080073 A | * | 11/2016 | | |
| CN | 113335381 A | * | 9/2021 | | |
| EP | 1685988 A1 | * | 8/2006 | ........... | B60B 35/001 |
| WO | WO-9922978 A1 | * | 5/1999 | ............ | B60G 7/005 |
| WO | WO-2014158935 A1 | * | 10/2014 | ............... | A61G 5/12 |

* cited by examiner

*Primary Examiner* — Nicole T Verley
(74) *Attorney, Agent, or Firm* — Plager Schack LLP; Mark H. Plager; Naomi Mann

(57) ABSTRACT

A system for camber adjustment in a motor vehicle comprises installing an adjustable lower control arm in the vehicle. The adjustable lower control arm comprises a first component configured to couple to a front wheel of the vehicle, and a second component configured to adjustably assembly to the first component and which supports a connector element configured to couple to the vehicle's frame.

6 Claims, 3 Drawing Sheets

CAMBER ADJUSTMENT SYSTEM

RELATED APPLICATION

This application claims benefit to U.S. Provisional Application No. 63/522,868 filed Jun. 23, 2023, which is incorporated by reference herein in its entirety.

BACKGROUND

The present disclosure relates generally to camber adjustment vehicle systems and components.

The camber angle is defined as the angle between the wheel and the car's body. When the camber angle falls out of the intended range, a vehicle may not handle as the automaker intended. This can cause potential safety issues. It can also cause excessive tire wear. While there are various techniques and procedures for camber adjustment in most vehicles, in certain vehicles such as the FORD® Transit, adjusting the vehicle's camber may be highly impractical. As such, an improved system is desirable.

SUMMARY

According to various embodiments, disclosed is system for camber adjustment in a motor vehicle, which comprises installing an adjustable lower control arm in the vehicle. In some embodiments, the adjustable lower control arm comprises a first component configured to couple to a front wheel of the vehicle, and a second component configured to adjustably assembly to the first component and which supports a connector element configured to couple to the vehicle's frame. In some embodiments, the first component and the second component are in lateral slidable and/or nested engagement that allows for adjustment in a lateral length of the control arm. In some embodiments, there is at least one elongated slot provided in one of the first component or the second component, and at least one bolt hole provided in the other one of the first component or the second component, wherein the bolt hole aligns continuously with the elongated slot as the position of the first component is laterally adjusted with respect to the second component, and wherein the aligned bolt hole and slot are configured to receive at least one first fastener aligned in a first direction. In certain embodiments, the system further comprises sliding the first component relative to the second component to achieve a desired camber angle; and securing the first component to the second component using said first fastener. In further embodiments, the system may comprise reinforcing securement of the first component to the second component via at least one second fastener aligned in a second direction traverse to the first direction of the first fastener and inserted through aligned reinforcement slots within the first component and the second component. In some embodiments, the first component comprises a block structure, and the second component comprises a receptacle box structure configured to slidably receive the block structure of first component. In certain embodiments, the first component includes the elongated slot, and the second component includes the bolt hole configured to receive the first fastener. In some embodiments, the first component includes two elongated slots which are symmetrically disposed within the first component. In certain embodiments, the adjustable lower control arm is used to replace an existing non-adjustable lower control arm in the vehicle. In some embodiments, the vehicle is a FORD® Transit Van.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

According to various embodiments, disclosed is a system and method for camber adjustment in a motor vehicle 36, which comprises providing an adjustable lower control arm 10 in the vehicle. In certain embodiments, adjustable lower control arm 10 may be used to replace an existing, i.e., manufacturer provided, lower control arm of the vehicle. In other embodiments, adjustable lower control arm 10 may be incorporated into a manufactured vehicle.

Figure 1:
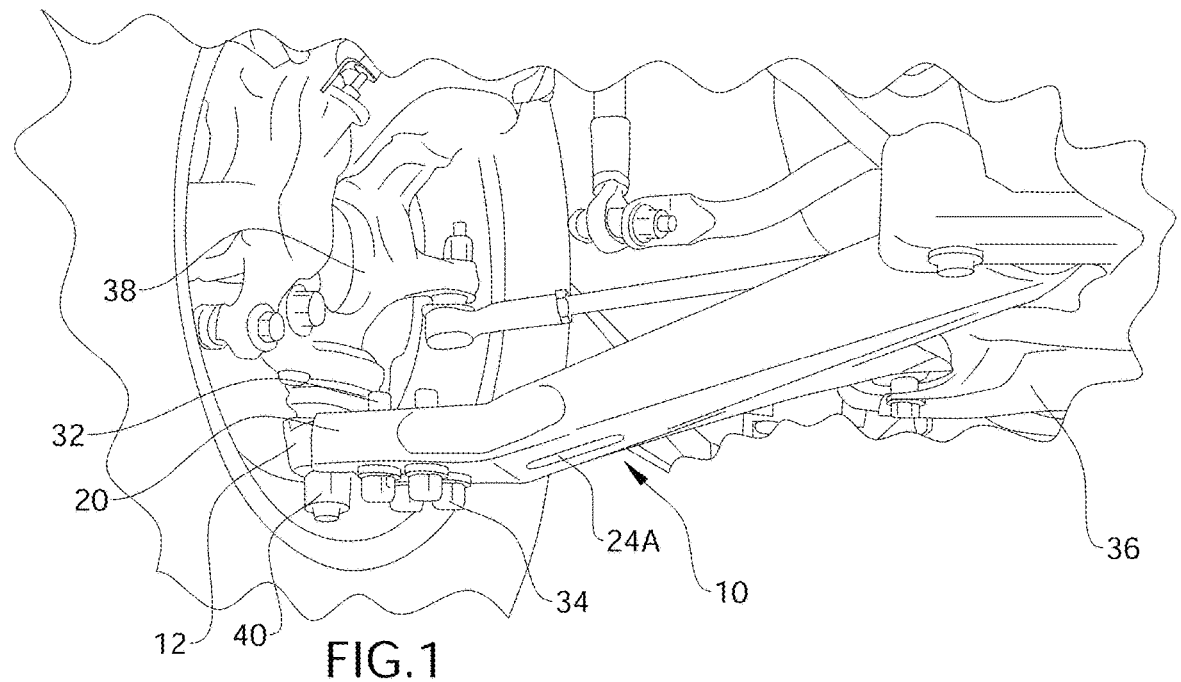
FIG. 1 is a perspective view of an adjustable lower control arm for a motor vehicle according to certain embodiments, shown in use.
Figure 2:
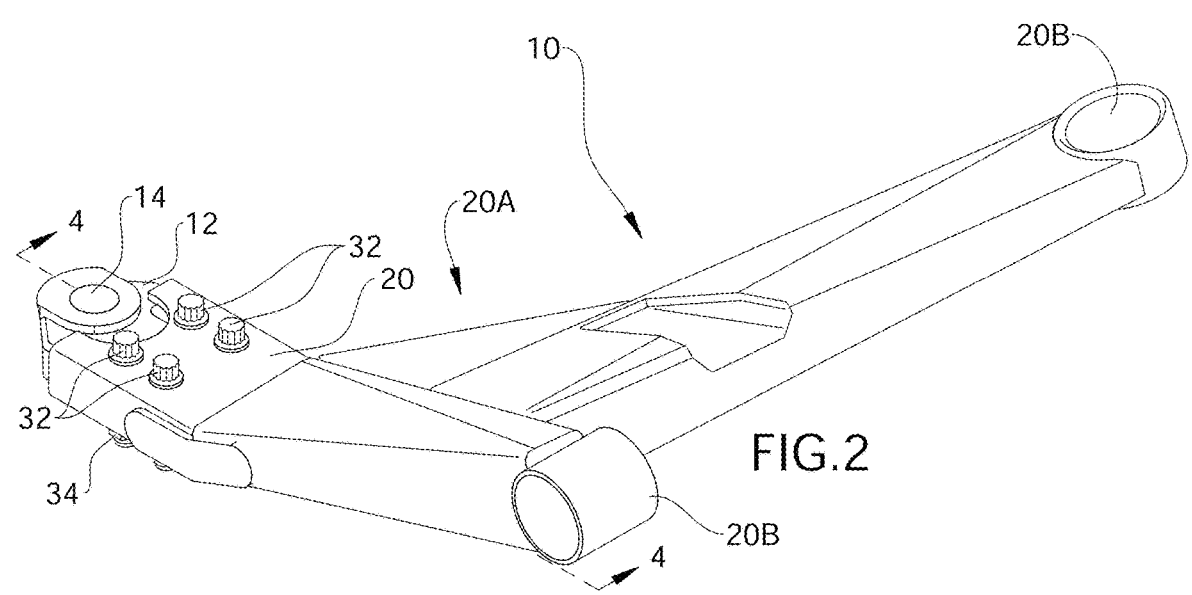
FIG. 2 is a perspective view of the adjustable lower control arm.
Figure 3:
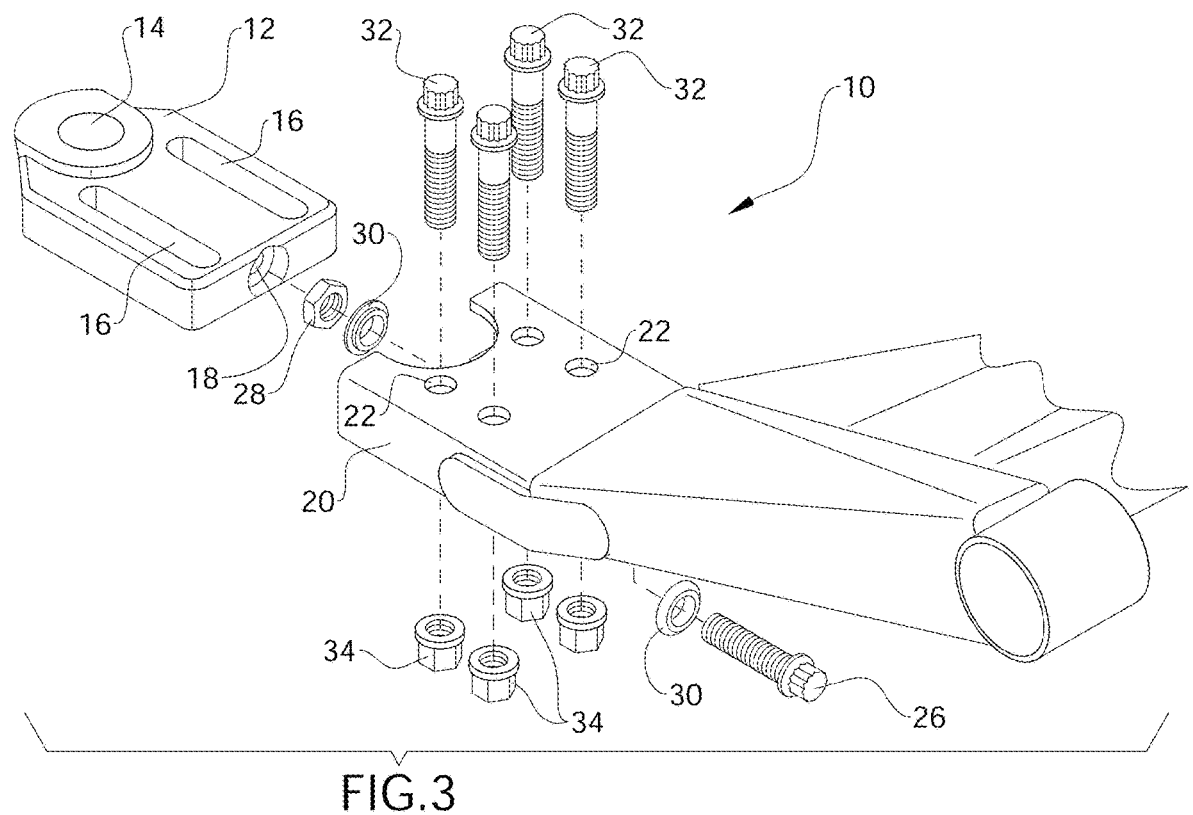
FIG. 3 is an exploded view thereof.
Figure 4:
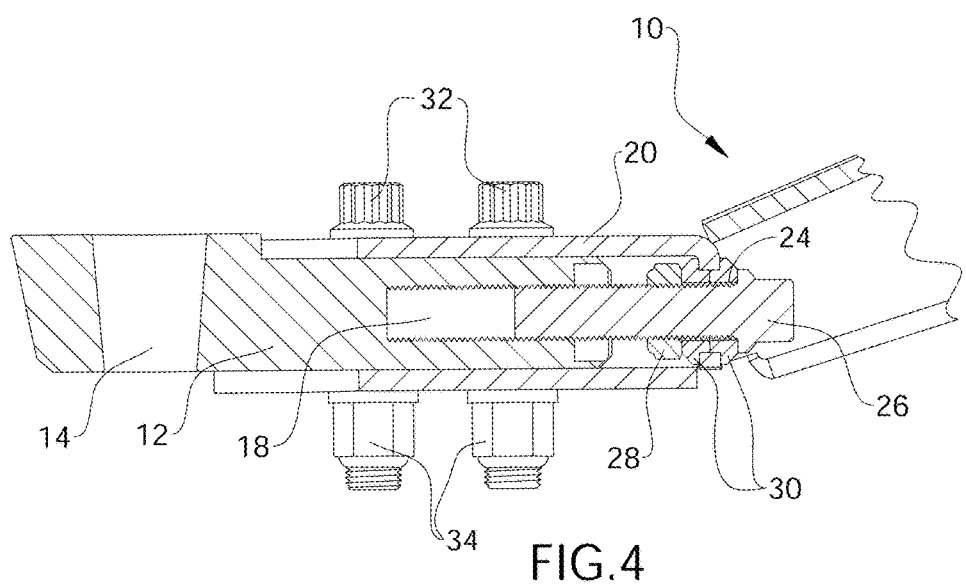
FIG. 4 is a section view along line 4-4 in FIG. 2
Figure 5:
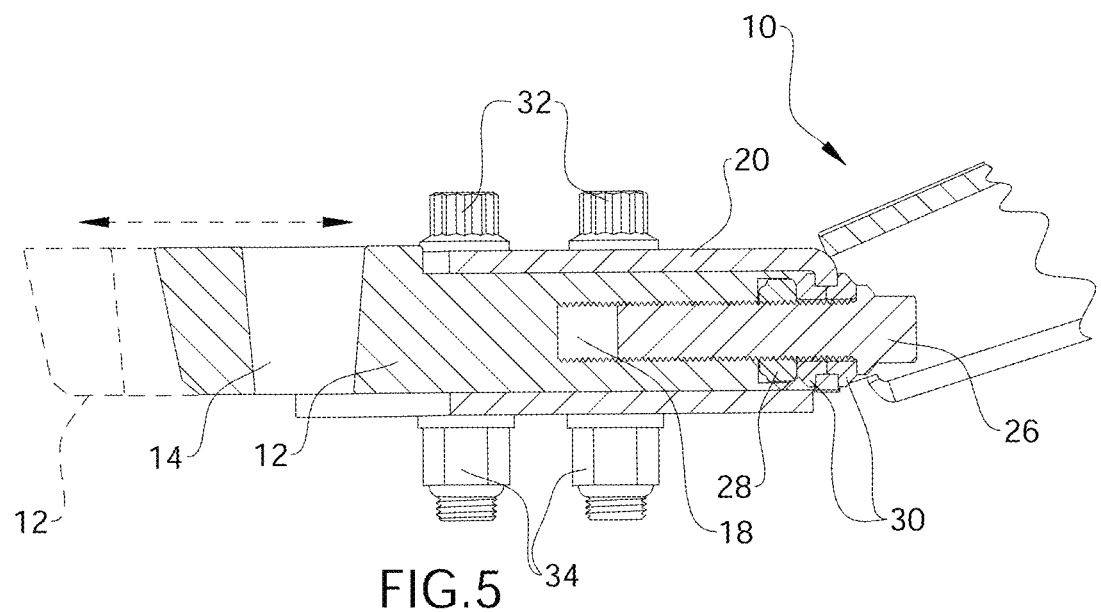
FIG. 5 is a section view similar to that of FIG. 4, depicting adjustment of the control arm.

In certain embodiments, as depicted in FIGS. 1-5, the adjustable lower control arm 10 may be applied to a FORD® Transit Van, wherein camber adjustment with the manufacturer's control arm is highly challenging or impractical for most technicians. It shall be appreciated, however, that the disclosed method and system may be applied to other vehicles in alternate embodiments.

In certain embodiments, lower control arm 10 may comprise a first component 12 configured to couple to the vehicle's front wheel, and a second component 20 configured to adjustably assembly to first component 12 and which supports a connector element 20A configured to couple to the vehicle's frame. In one embodiment, first component 12 includes a ball joint pocket 14, configured to couple to ball joint 40 of the lowermost part of the vehicle's wheel or upright 38, and connector element 20A of second component 20 includes bushings 20B or other connectors that couple to the vehicle's frame.

In certain embodiments, attachment between first component 12 and second component 20 is laterally adjustable to allow for adjustment of length in lower control arm 10, and hence adjustment of the camber angle when lower control arm 10 is installed within vehicle 36. To this end, and in accordance with certain embodiments, first and second components 12 and 20, respectively, may be in slidable and/or nested engagement. In some embodiments, first component 12 may comprise a block structure, and second component 20 may comprise a receptacle box structure configured to slidably receive the block structure of first component 14. In further embodiments, first component 12 and second component 20 may further be secured together via a first set of fasteners 32 (i.e., first bolts 32 and nuts 34) once their relative position has been set.

In certain embodiments, first component 12 includes one or more bolt slots 16 configured to align with one or more bolt holes 22 in second component 20. As such, the position of first component 12 may be laterally slid within second component 20 to enable adjustment of the control arm length. Once the desired length has been achieved, first component 12 may be securely coupled to second component 20 by inserting first fasteners 32, which may be lock bolts through bolt holes 22 and slots 16, and securing bolts 32 via locking elements such as locking nuts 34. This allows for lateral adjustment between first component 12 and second component 20 to adjust the length of lower control arm 10, and hence the camber angle of the front vehicle wheel coupled to lower control arm 10. In one embodiment as depicted in the figures, first component 12 includes right and left bolt slots 16 in its upper surface, and second component 20 includes two right side bolt holes 22 in its upper surface which align over the right and left side bolt slots 16, respectively.

In further embodiments, lower control arm 10 may include at least one reinforcement fastener 26 (i.e., bolt) which may be installed in traverse alignment to first fastener (s) 32 to further secure attachment between the first component to the second component. In one embodiment, first component 12 includes a central threaded hole 18 which aligns with an adjuster bolt hole 24 in adjuster box 20 and is configured to receive bolt 26 that may be secured via adjuster nut 28 and spin washers 30. In one embodiment, a slot 24A may be provided within a bottom of control arm 10 for access to adjuster bolt 26.

Thus, the disclosed subject matter provides a camber adjustment system which comprises replacement of a vehicle's lower control with an adjustable control arm. In certain embodiments, the disclosed lower control arm may be used to replace the lower control arm of a Ford® Transit Van, wherein camber adjustment is highly impractical. However, in other embodiments, the disclosed lower control arm may be an original part of a manufactured vehicle.

It shall be appreciated that the disclosed device and system can have multiple configurations in different embodiments. For example, in some alternate embodiments, first component 12 may comprise the receptacle structure and second component may be the block structure configured to slide within the receptacle structure of the first component. Additionally, bolt slots 16 and bolt holes 22 may be provided on the bottom or side walls of the first and second components in other alternate embodiments. Furthermore, any number of bolt slots 16 and bolt holes 22 may be provided in alternate embodiments. Additionally, other reinforcement fasteners may be provided in various positions and locations within the first and second components in alternate embodiments.

In one embodiment, lower control arm 10 may be made of steel, in some embodiments, adjuster block 12 can be made out of steel or aluminum. It shall be appreciated however that the components of control arm 10 may comprise any alternative known materials or combination of materials, including non-metals, in alternate embodiments. It shall be appreciated that the components of control arm 10 may be manufactured and assembled using any known techniques in the field and may be of any size and/or dimensions.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for camber adjustment in a motor vehicle, comprising:

installing an adjustable lower control arm in the vehicle, the adjustable lower control arm including a first component configured to couple to a front wheel of the vehicle, and a second component configured to adjustably assemble to the first component and which supports a connector element configured to couple to the vehicle's frame, wherein the first component and the second component are in lateral slidable engagement that allows for adjustment in a lateral length of the control arm, wherein the adjustable lower control arm further includes at least one elongated slot provided in one of the first component or the second component, and at least one bolt hole provided in the other one of the first component or the second component, wherein the bolt hole aligns continuously with the elongated slot as the position of the first component is laterally adjusted with respect to the second component, wherein the aligned bolt hole and slot are configured to receive at least one first fastener aligned in a first direction;

the method further comprising sliding the first component relative to the second component to achieve a desired camber angle;

securing the first component to the second component using said first fastener; and reinforcing securement of the first component to the second component via at least one second fastener aligned in a second direction traverse to the first direction of the first fastener and inserted through aligned reinforcement slots within the first component and the second component.

2. The method of claim 1, wherein the first component comprises a block structure, and the second component comprises a receptacle box structure configured to slidably receive the block structure of first component.

3. The method of claim 2, wherein the first component includes the elongated slot, and the second component includes the bolt hole configured to receive the first fastener.

4. The method of claim 3, wherein the first component includes two elongated slots which are symmetrically disposed within the first component.

5. The method of claim 1, wherein the adjustable lower control arm is used to replace an existing non-adjustable lower control arm in the vehicle.

6. The method of claim 1, wherein the vehicle is a FORD® Transit Van.

* * * * *